B. SEELINGER.
DOUGH TROUGH.
APPLICATION FILED OCT. 31, 1916.

1,246,335. Patented Nov. 13, 1917.

Inventor
Bernhard Seelinger
By his Attorney
H. T. Criswell

UNITED STATES PATENT OFFICE.

BERNHARD SEELINGER, OF BROOKLYN, NEW YORK.

DOUGH-TROUGH.

1,246,335.  Specification of Letters Patent.  Patented Nov. 13, 1917.

Application filed October 31, 1916. Serial No. 128,716.

*To all whom it may concern:*

Be it known that I, BERNHARD SEELINGER, a citizen of the United States, and a resident of New York, borough of Brooklyn, county of Kings, and State of New York, have invented a certain new and useful Improvement in Dough-Troughs, of which the following is a full, clear, and exact specification.

This invention relates to a class of apparatus adapted to be used in the process of making bread and the like.

My invention has for its object primarily the provision of a trough whereby the dough of bread and the like while being prepared for baking may be kept in a compact mass during the process of rising so that its unexposed parts will be free from subjection to currents of air which tend to cause the dough to "fall" by its cells being chilled, and which is of a form serving to permit large quantities in a single or in a number of batches to be properly held for rising as well as avoiding the present methods in use wherein the mass of dough is propped-up by employing various unsanitary articles, such as barrels, boards, etc. The invention resides mainly in providing a trough, or elongated body member, and removably disposed in the body member may be one or a number of transverse partitions for dividing the body in chambers of given sizes to accommodate the dough.

Another object of the invention is to provide one, or a number of catches whereby each partition may be releasably held in the body member against accidental movement; and a further object of the invention is to provide a dough trough of a simple and efficient construction which may be made in various sizes and shapes.

A practical embodiment of the invention is represented in the accompanying drawing forming a part of this specification in which similar characters of reference indicate corresponding parts in all the views, the said invention being more fully described hereinafter, and then pointed out in the claims at the end of the description.

In the drawing, Figure 1 is a side elevation, partly broken away and partly in section, of one form of dough trough embodying my invention.

Figure 1:
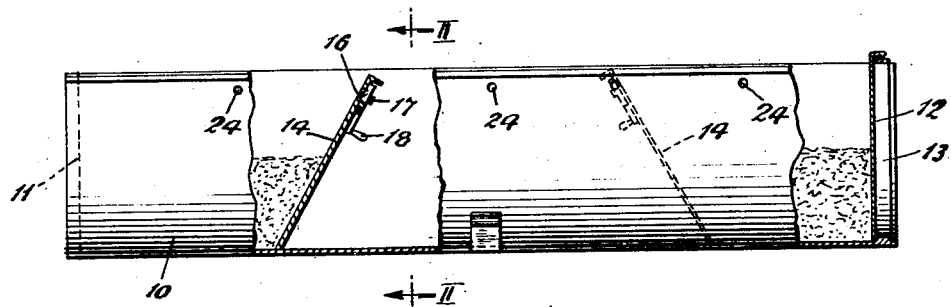
Figure 2:
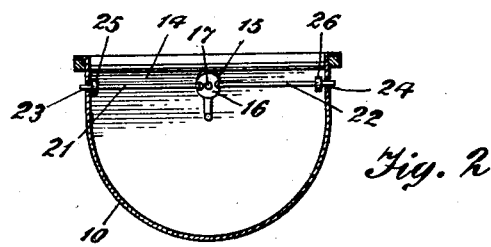
Fig. 2 is a section taken on the line II—II of Fig. 1.

The apparatus, or trough has an elongated body member 10 which may be of a suitable size and shape, though the body member is preferably substantially semi-circular, as viewed transversely, to provide an open top, and one end of the body member is closed by a stationary wall, or plate 11. The other end of the body member is closed by a removable transverse plate 12 to allow this end of the body member to be opened for dispensing dough from the interior of the body member. The plate 12 is also approximately semi-circular in shape as well as being of a size to fit closely in the interior of the body member, and this plate is prevented from accidental movement by being arranged to movably abut against a flange, as 13, projecting inwardly of the body member.

The ingredients of the dough for making bread and the like may be mixed and kneaded in the body member 10, though in large bakeries the dough is first made in a mixer, and then transferred to the body member to undergo the usual rising process. In order to accommodate a single batch, or a number of batches of the dough for the rising process as well as to retain each batch in a properly compact mass to prevent its cells from being chilled by currents of air, I provide one, or a number of removable partitions, as 14, for dividing the interior of the body member 10 into a number of chambers of suitable capacity. The partitions 14 are preferably alike in formations, and each partition may be in the form of a plate of a substantially semi-circular shape as well as being somewhat larger than the interior of the body member transversely so that when arranged in the body member the plate will be disposed on an incline, as shown. As these partitions together with the body member 10 are preferably made of sheet metal the weight of the dough pressing on the upper inclined surface of the partitions will tend to force the edges of the partitions into close engagement with the curved side wall and bottom of the body member to prevent air from passing between the partitions and the body member.

Serving to releasably hold each partition in the body member 10 any preferred form of retaining means may be employed, though I prefer to provide each partition with a catch, as 15, all of which may be similarly formed. Each of the catches 15 has an eccentric 16 which may be in the form of a circular plate, or disk, and the central part of each disk is rotatable on a pin, or stud 17 projecting from the upper part of one of its respective partitions. On the disk of each partition is a handle, as 18, to allow the disk to be rotatably swung, and to diametrically opposite parts of one face of each disk are pivoted, at 19 and 20, opposite ends of two rods 21 and 22 so that when the disk of each partition is partially rotated the rods will be guided longitudinally back and forth toward and from each other transversely of the partition. These rods are of lengths so that when moved in opposite directions to their extreme distances the second ends of the rods will protrude somewhat beyond the opposite parts of the edge of the partition so as to be removably inserted in spaced pairs of registered openings 23 and 24 formed in the upper parts of the wall of the body member 10, and to support the second end portions of each pair of the rods these parts of the rods are movably disposed through two straps, as 25 and 26, provided on the partition of the rods.

Figures 3, 4:
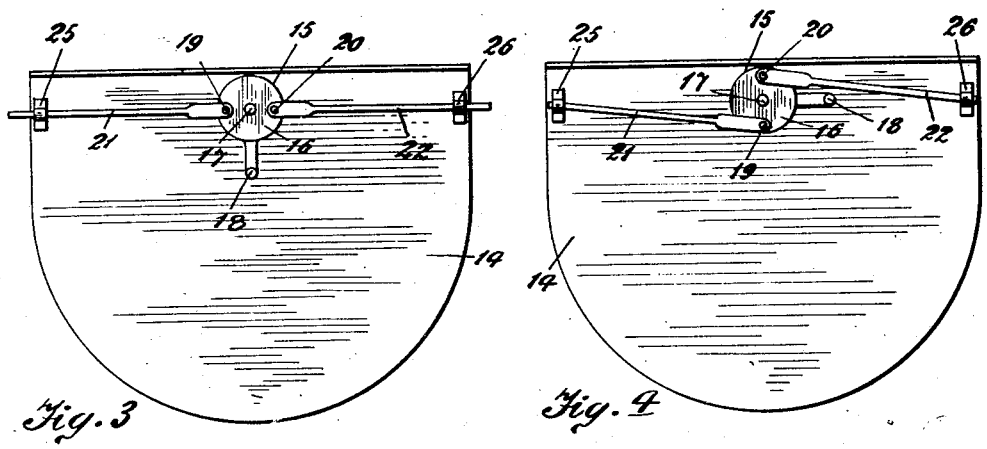
Fig. 3 is an elevation of one of the removable partitions used in the trough, and which shows the catch of the partition in a locked position.
Fig. 4 is a similar view of the partition showing the catch in an unlocked position.
Figure 5:
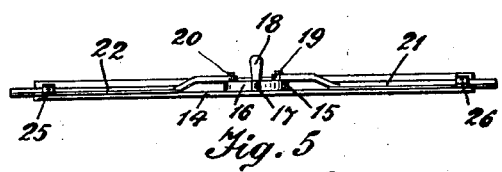
Fig. 5 is an inverted edge view of the partition shown in Fig. 3.

In order to use the trough for permitting one or more batches of dough to be held therein for rising, the trough is divided into chambers by arranging a suitable number of the partitions 14 on inclines transversely of the interior of the body member, as shown in Fig. 1, following the positioning of the rods 21 and 22 of the catch of each partition, as illustrated in Fig. 4, by swinging the handle 18 and the disk 16 accordingly. The handle is then reversely swung to turn the eccentric, or disk 18 for directing the second ends of the rods of each partition into one of the pairs of registered openings 23 and 24 of the trough, and the partitions will then be releasably locked to the body member of the trough. Each of the chambers thereby provided will accommodate a required quantity of dough for being confined in the form of a mass so that its cells will be free of liability of being chilled by currents of air.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

In an apparatus of the character described, a partition including means for removably applying the partition within a trough having pairs of registered openings at spaced intervals therethrough, and said partition being larger than the interior of the trough so as to be disposed on an incline, and the said means comprising a circular plate having its center pivoted centrally of the partition, two rods having their opposite ends pivoted to diametrically opposite parts of the plate for being guided back and forth toward and from each other transversely of the partition so that their second ends will removably engage one of the pairs of openings of the trough when the disk is accordingly rotated.

This specification signed and witnessed this 30th day of October, A. D. 1916.

BERNHARD SEELINGER.

Witnesses:
  GEORGE F. BENTLEY,
  V. M. RUMPH.

Copies of this patent may be obtained for five cents each, by addressing the "Commissioner of Patents, Washington, D. C."